US009244597B1

(12) United States Patent
Moreno et al.

(10) Patent No.: US 9,244,597 B1
(45) Date of Patent: Jan. 26, 2016

(54) REPRESENTING SPATIAL RELATIONSHIPS OF ELEMENTS ON A USER INTERFACE

(71) Applicant: GOOGLE INC., Mountain View, CA (US)

(72) Inventors: Camilo Arango Moreno, Mountain View, CA (US); Shadi Abdul Khalek, Kirkland, WA (US); Yongrim Rhee, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 443 days.

(21) Appl. No.: 13/713,297

(22) Filed: Dec. 13, 2012

Related U.S. Application Data

(60) Provisional application No. 61/570,060, filed on Dec. 13, 2011.

(51) Int. Cl.
*G06F 3/0484* (2013.01)
*G06F 17/28* (2006.01)
*G06F 9/44* (2006.01)
*G06F 11/36* (2006.01)

(52) U.S. Cl.
CPC ............ *G06F 3/0484* (2013.01); *G06F 9/4448* (2013.01); *G06F 11/3664* (2013.01); *G06F 17/28* (2013.01)

(58) Field of Classification Search
CPC ... G06F 17/211; G06F 9/4448; G06F 17/289; G06F 17/28; G06F 17/2247; G06F 11/3664; G06F 17/20; G06F 3/0481; G06F 3/0484
See application file for complete search history.

(56) References Cited

U.S. PATENT DOCUMENTS

| | | | | |
|---|---|---|---|---|
| 5,812,122 A | * | 9/1998 | Ng | 715/703 |
| 6,023,714 A | * | 2/2000 | Hill et al. | 715/235 |
| 7,073,137 B2 | * | 7/2006 | Hassanin et al. | 715/853 |
| 7,856,596 B2 | * | 12/2010 | Crider et al. | 715/243 |
| 2002/0111933 A1 | * | 8/2002 | Noble et al. | 707/1 |
| 2003/0025737 A1 | * | 2/2003 | Breinberg | 345/801 |
| 2004/0039996 A1 | * | 2/2004 | Flam | 715/536 |
| 2004/0059998 A1 | * | 3/2004 | Palmieri | 715/501.1 |
| 2006/0106593 A1 | * | 5/2006 | Schultz et al. | 704/5 |
| 2006/0218489 A1 | * | 9/2006 | Ovetchkine et al. | 715/517 |
| 2006/0279571 A1 | * | 12/2006 | Mori et al. | 345/443 |
| 2008/0082317 A1 | * | 4/2008 | Rosart et al. | 704/8 |
| 2008/0221867 A1 | * | 9/2008 | Schreiber | G06Q 30/0273 704/8 |
| 2011/0106524 A1 | * | 5/2011 | Mousaad | 704/8 |
| 2011/0107202 A1 | * | 5/2011 | El-Shishiny et al. | 715/243 |
| 2012/0159392 A1 | * | 6/2012 | Kauerauf | 715/826 |
| 2012/0162266 A1 | * | 6/2012 | Douglas et al. | 345/677 |

OTHER PUBLICATIONS

Abufardeh et al., Software Internationalization: Testing Methods for Bidirectional Software, 2009, IEEE.*

* cited by examiner

*Primary Examiner* — Nicholas Ulrich
(74) *Attorney, Agent, or Firm* — IP Spring (57) ABSTRACT

A system, method and computer readable medium including defining, for a rendering, an expression representative of a first relationship between elements based on one or more determined directionalities for the elements; forming a set comprising each of the expressions representative of the first relationships, the set defined as a second relationship based on the direction using position between the elements; and selecting one of the first relationships in the set based on the determined directionality.

22 Claims, 11 Drawing Sheets

REPRESENTING SPATIAL RELATIONSHIPS OF ELEMENTS ON A USER INTERFACE

CLAIM FOR PRIORITY

This application claims the benefit of priority to U.S. Provisional Application Ser. No. 61/570,060, filed Dec. 13, 2011, the entire contents of which are hereby incorporated by reference.

BACKGROUND

Background Information

Layout testing in computer systems verifies that content displayed on a user interface is spatially positioned to be accurate and consistent across the system, particularly when the user interface is displaying content using different browsers, languages and screen or window dimensions. Layout problems are particularly likely to occur when a different language is used to convey the same content, especially when that new language is bidirectional (bidi), requiring a change from a left-to-right (LTR) to right-to-left (RTL) reading, or vice versa. For example, layout inaccuracies and inconsistencies may occur in languages such as Arabic, Farsi and Hebrew since the order of the content is often mirrored from a non-bidi language (such as English) without further manipulation. Similar inaccuracies and inconsistencies may occur due to resizing a window on the user interface or changing the browser used to display content. As the number of products, supported platforms, browsers and languages being used increases, it may become progressively difficult to verify the accuracy and consistency of all configurations using this primitive technique.

SUMMARY OF THE DISCLOSURE

The present disclosure generally relates to verification of a user interface layout, and in particular, to the accuracy and consistency of displayed content on the user interface independent of directionality of the content displayed.

The present disclosure, through one or more of its various aspects, implementations, and/or specific features or sub-components, provides various systems, servers, methods, media, and programs for generating a graphical comparison of data files.

A system, method and computer readable medium for testing and verifying a user interface layout when the mode of display changes (e.g. the type of browser, window size or language changes). The screen layout is tested independent of direction by describing the position of elements (spatial relationships) in the user interface with respect to one another. The test automatically checks, for example, the language (e.g. English) being displayed on the user interface and then tests for corresponding directionality of elements. This allows for testing of both bi-directional (bidi) and non-bidi languages. The system also provides a framework for writing and verifying layout properties whereby a user may describe different layout properties and verify their accuracy and consistency in different languages, particularly in bidi languages where the layout is often flipped symmetric to, for example, non-bidi languages such as English.

According to one implementation, there is a computer-implemented method, including defining, for a rendering, an expression representative of a first relationship between elements based on one or more determined directionalities for the elements; forming a set comprising each of the expressions representative of the first relationships, the set defined as a second relationship based on the direction using position between the elements; and selecting one of the first relationships in the set based on the determined directionality.

According to another implementation, a computer-implemented method, including determining, for a first rendering, one or more first relationships between a first element and a second element based on an actual direction from the first element to the second element; abstracting from the one or more first relationships to define a second relationship based on a relative spatial relationship between the first element and the second element, where the relative spatial relationship is different from the actual direction from the first element to the second element; determining a directionality for a second rendering; and mapping between the one or more first relationships and the second relationship based on the directionality of the second rendering.

According to another implementation, there is computer-implemented system, including a memory; and at least one processor: defining, for a rendering, an expression representative of a first relationship between elements based on one or more determined directionalities for the elements; forming a set comprising each of the expressions representative of the first relationships, the set defined as a second relationship based on the direction using position between the elements; and selecting one of the first relationships in the set based on the determined directionality.

According to still another implementation, there is a computer program product embodied on a computer-readable medium and storing a computer program to direct at least one computer processor, the at least one computer processor including defining, for a rendering, an expression representative of a first relationship between elements based on one or more determined directionalities for the elements; forming a set comprising each of the expressions representative of the first relationships, the set defined as a second relationship based on the direction using position between the elements; and selecting one of the first relationships in the set based on the determined directionality.

These and other implementations may include one or more of the following features. Determining the one or more directionalities of the elements for display on the user interface; the first relationship is a directionality-explicit spatial relationship; the second relationship is a directionality-agnostic spatial relationship; mapping the second relationship to the first relationship based on directionality; the directionality is left-to-right or right-to-left; and a plurality of elements are grouped to form a single element.

These and other implementations may provide one or more of the advantages described in detail below.

BRIEF DESCRIPTION OF THE DRAWINGS

The present technology is further described in the detailed description which follows, in reference to the noted plurality of drawings, by way of non-limiting examples, in which like characters represent like elements throughout the several views of the drawings.

DETAILED DESCRIPTION

The present disclosure, through one or more of its various aspects, implementations and/or specific features or sub-components, is thus intended to bring out one or more of the advantages as specifically noted below.

Figure 1:
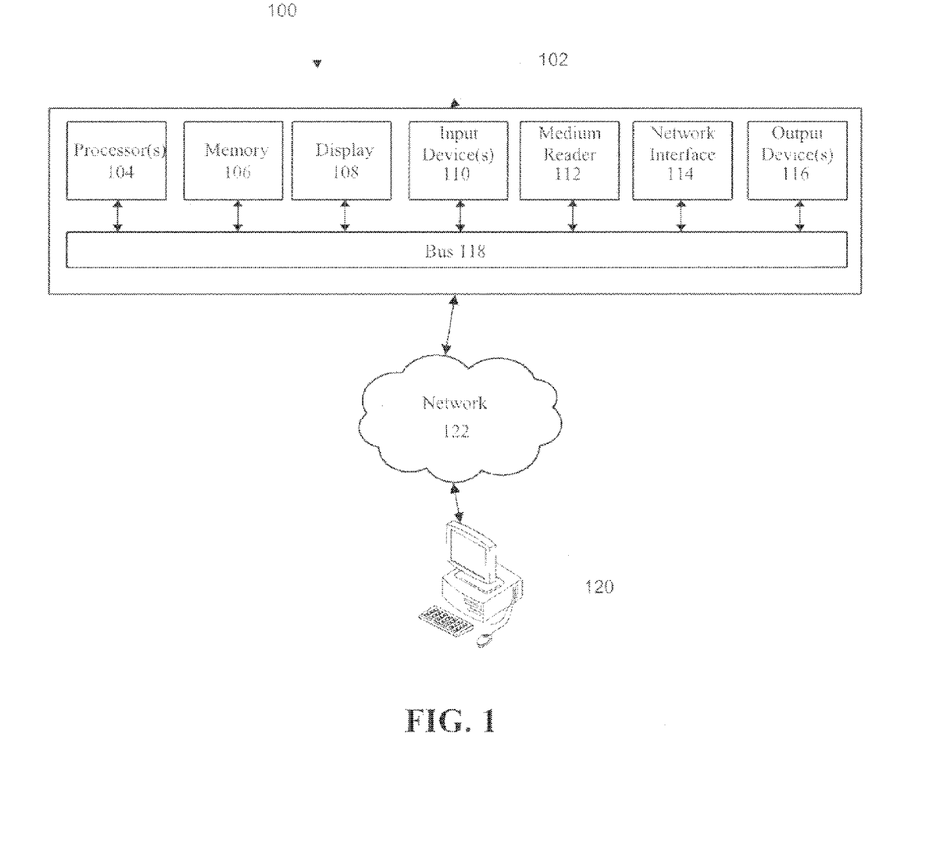
FIG. 1 is an example implementation of a system.

FIG. 1 is an example implementation of a system. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, or communication networks.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition implementations may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various implementations of the computer system 102 may include multiple input devices 110. Moreover, those skilled in the art further appreciate that the above-listed, example input devices 102 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative implementations of the present application, the device 120 may be a laptop computer, a tablet PC, a personal digital assistant, a mobile device, a palmtop computer, a desktop computer, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely example devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be examples and are not intended to be exhaustive and/or inclusive. Furthermore, the examples of the components listed above are also meant to be examples and similarly are not meant to be exhaustive and/or inclusive.

Figure 2:
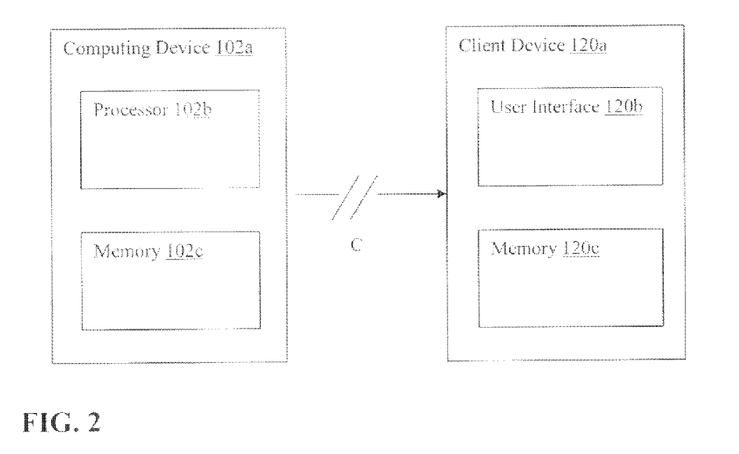
FIG. 2 is an example implementation of a computing device and client.

FIG. 2 is an example implementation of a computing device and client device. A computing device 102a, including a processor 102b and memory 102c, communicates with client device 120a via connection C, including a user interface 120b and memory 120c. Computing device 102a may be the same or similar to, for example, computing system 102 or any variation thereof as readily understood by the skilled artisan. In one implementation, computing device 102a is a personal computer, whereas in another implementation computing device 102a is a server. Processor 102b may include, for example switching logic to select relationships between displayed elements (as explained below in more detail). It is appreciated, however, that the computing device is not limited to these example implementations. Computing device 102a, as well as client device 120a, may also be any type of device, such as a personal computer, mobile device, tablet or any other type of device accessible by the computing device 102a. Connection C may be any type of connection, such as the Internet, and intranet, extranet, WAN, LAN, phone line, wireless connection, wired connection or any other type of connection as appreciated by the skilled artisan. The computing device 102a and client device 120a may reside on different networks or on the same network, which network may include any number of computing and client devices.

In an example implementation of the computer system illustrated in FIG. 2, computing device 102a is responsible for processing layout configurations for data to be displayed, for example, on the user interface 120b of client device 120a. For example, if client device 120a requests a web page be displayed on user interface 120b, the request is sent to computing device 102a. At computing device 102a, the processor determines through various calculations a layout of elements included in the requested web page to be displayed on the user interface 120b. That is, the processor calculates the spatial relationships of elements included in the web page to be displayed on the user interface 120b, and sends the requested web page (in the calculated layout) to client device 120a. Alternatively, the spatial relationships between elements (layout) may be pre-calculated and the processor is responsible for determining which of the pre-calculated layouts is suited for requested web page. It is appreciated that although a web page is being requested in the example implementation, the disclosure is not limited to requesting web pages. The request may be any request of information to be displayed on user interface 120b (user interface 120b may be a visual display, audible display, tactile display or any other type of display as readily appreciated to the skilled artisan). Additionally, calculation of the spatial relationships, as it will be described in more detail below, may be based on a variety of factors, including for example, browser type, language of the displayed data, screen or window size of the displayed data on the user interface, size of the displayed data, etc. Moreover, the data being requested may or may not reside on the computing device 102a.

Figure 3:
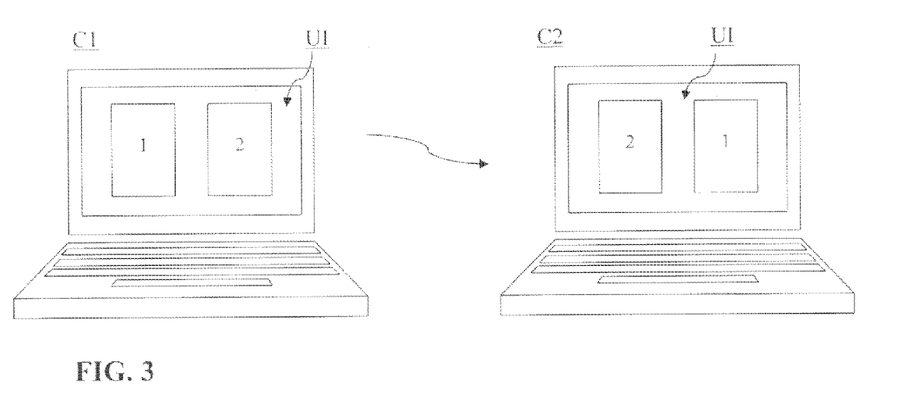
FIG. 3 is an example implementation of a client device displaying content on a user interface.

FIG. 3 is an example implementation of a client device displaying content on a user interface. In FIG. 3, a user interface UI of a computer displays content (elements 1 and 2) in a horizontally aligned manner. As viewed in the figure, it is appreciated that horizontal alignment is dependent on direction. That is, alignment of elements displayed on the user interface UI is determined, at least in part, on the direction of the content displayed. In the illustrated example, the content display on the user interface UI changes such that the same content is displayed in a bidirectional (bidi) language. For example, content displayed on the user interface UI of client device C1 shows elements 1 and 2 in a LTR language configuration (for example, English), whereas the user interface UI of client device C2 shows the same content in a RTL language configuration (for example, Arabic), with elements 1 and 2 displayed. Often, when the language configuration changes, the horizontal alignment also changes in a corresponding manner. Similarly, if the content is changed from a horizontal direction to a vertical direction, elements 1 and 2 would be displayed on the user interface UI of client device C1, with element 1 appearing above element 2 (not shown).

As understood by the skilled artisan, directionality is used to describe a visual direction of an object or element that is, for example, displayed on a user interface. Objects including text and other elements being displayed include, but are not limited to, buttons, input fields, images (static or dynamic), etc. As appreciated, any type of image, text or otherwise, may be displayed as an object or element within the context of this disclosure. A directionality-explicit spatial relationship is a way to describe a relationship of multiple objects or elements using abstract positions, where as a directionality-agnostic spatial relationship is instantiated by one or more directionality-explicit spatial relationships. That is, directionality-explicit spatial relationships are defined using direction (e.g. left, right, etc.), whereas directionality-agnostic spatial relationships are defined using terms that reflect such direction using position between content. Examples of directionality-explicit spatial relationships include, for example: element 1 is to the left of element 2; element 1 is to the right of element 2; element 1 is horizontally aligned to the left of element 2; and element 1 is horizontally aligned to the right element 2. Examples of directionality-agnostic spatial relationships include, for example: element 1 leads element 2; and element 1 and element 2 are horizontally aligned.

Figure 4:
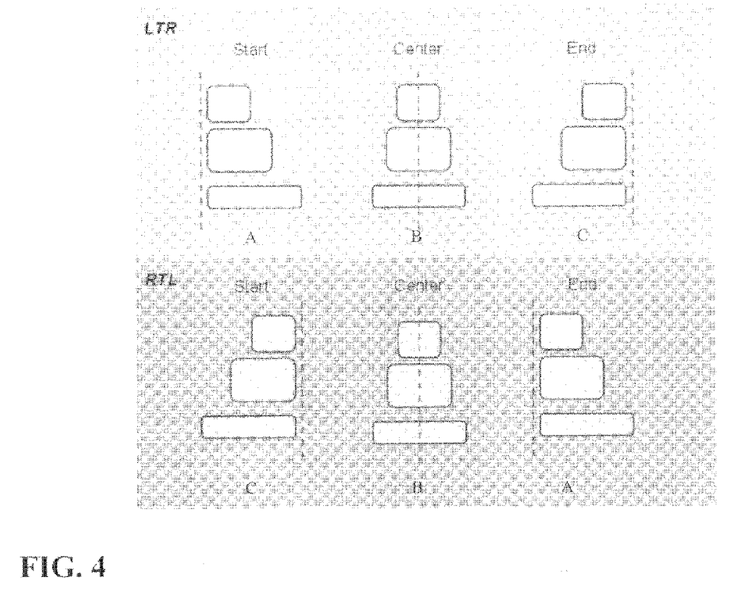
FIG. 4 is an example implementation of a horizontal alignment of elements on a user interface.

FIG. 4 is an example implementation of a horizontal alignment of elements on a user interface. Horizontally aligned elements depend on the directionality of the content being displayed on the user interface UI. Therefore, the meaning of "start" (beginning) and "end" of the displayed content depends on the direction of the mode of display, such as a LTR configuration or RTL configuration. According to the example of FIG. 4, element A, element B and element C are horizontally aligned and displayed on a user interface UI in a LTR (upper diagram) and RTL (lower diagram) language configuration (mode). In the LTR configuration, the contents on the user interface UI are read from left to right, whereby element A is the start, element B is the center and element C is the end. As illustrated, dotted vertical lines represent alignment, where element A is aligned to the left, element B is centered and element C is aligned to the right. In the RTL configuration, the contents of the user interface UI are read from right to left, whereby element A is aligned to the left, element B is centered and element C is aligned to the right. To determine the layout of content on the user interface UI without respect to directionality (as will be described below in more detail), various expressions are used to define spatial relationships between elements of the content being displayed. For example, the expression "leadingSideOf(element)" returns an x-value of the left side of the element in the LTR configuration, and the x-value of the right side of the element in a RTL configuration. Similarly, the expression "trailingSideOf(element)" returns the x-value of the right side of the element in a LTR configuration, and the x-value of left side in a RTL configuration. Although the described implementations refer generally to LTR and RTL configurations, it is appreciated that the disclosure is not limited to such implementations.

Figure 5:
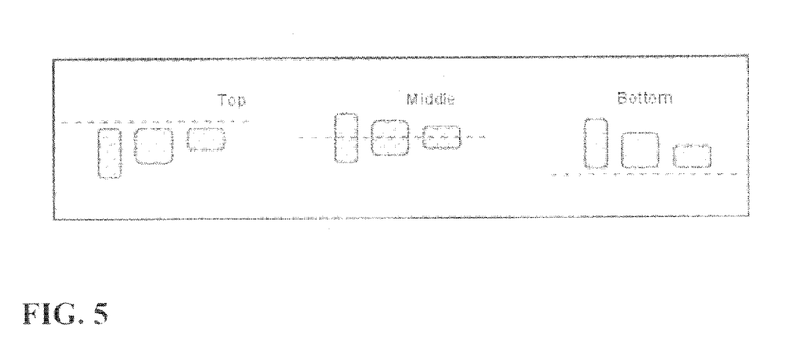
FIG. 5 is an example implementation of a vertical alignment of elements on a user interface.

FIG. 5 is an example implementation of a vertical alignment of elements on a user interface. Vertically aligned elements, unlike horizontally aligned elements, are independent of directionality. Therefore, layout verification of content vertically displayed on a user interface does not necessarily require a determination of spatial relationships independent of directionality, similar to that described with respect to horizontal alignment. That is, when directionality is LTR or RTL, vertical alignment is directionality independent. For example, in the user interface depicted, elements are vertically aligned to the "top", "middle" or "bottom" irrespective of the directionality of the content displayed on the screen. That is, whether the displayed content is an LTR or RTL language, the "top", "middle" and "bottom" of the elements remain the same. Similarly, expressions may be applied to an element in order to determine whether an element is "above" or "below" another element. For example, the function "topOf(element)" will return the y-value of the top (upper) side of the element, and the function "bottomOf(element)" will return the y-value of the bottom (lower) side of the element. Layout is then determined using an expression, such as assertThat(topOf(e1), is(above(bottomOf(e2)))).

Figure 6:
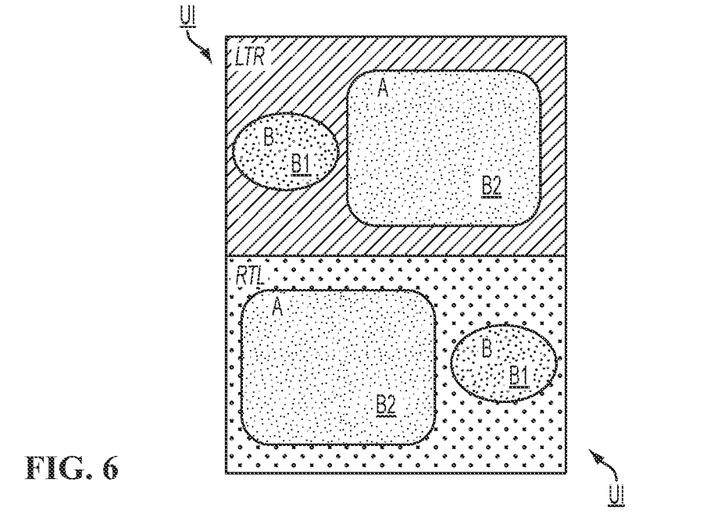
FIG. 6 is an example implementation of horizontally adjacent elements on a user interface.

FIG. 6 is an example implementation of horizontally adjacent elements on a user interface. Spatial relationships between elements of content displayed on a user interface UI may also be defined with respect to adjacency. In the example implementation of FIG. 6, the user interface UI illustrates a first implementation where element A and element B are adjacent to one another in a LTR configuration. In a second implementation, element A and element B are also adjacent to one another, albeit in a RTL configuration. Since horizontal alignment is dependent on directionality, in the traditional verification of the layout, two separate verification tests would be required in order to determine the accuracy and consistency of the layout, namely, one for the LTR configuration and another for the RTL configuration. However, applying the directionality-agnostic layout method disclosed herein, a single verification may be performed using directionality-agnostic relationships (described in detail below). As an example, rather than having to apply a LTR and RTL analysis, the method uses expressions to define the spatial relationships between elements. For example, the terms "lead" and "trail" are used to described the spatial relationships between elements, such as expressions "lead(targetElem1, targetElem2)" (whereby the elements precede the target elements) and "trail(targetElem1, targetElem2)" (whereby the elements follow the target elements). Applying this terminology to the illustrated implementations, element A trails element B in the LTR configuration, and element B leads element A in the RTL configuration. Additionally, in one implementation, in order to easily determine boundaries of an element, the element is circumscribed by a defined boundary. For example, element A is circumscribed by boundary B2 and element B is circumscribed by boundary B1.

Figure 7:
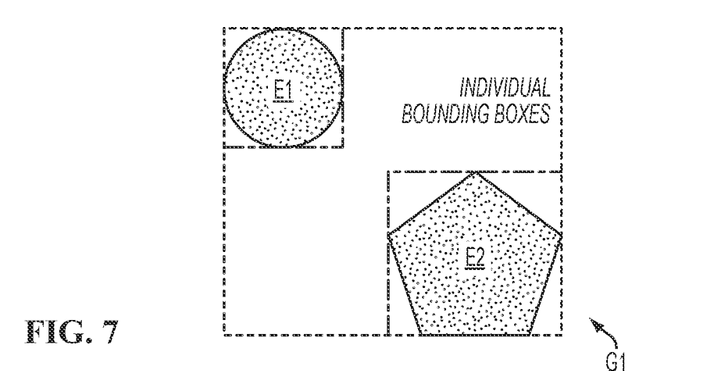
FIG. 7 is an example implementation of grouping elements on a user interface.

FIG. 7 is an example implementation of grouping elements on a user interface. In the previously disclosed implementations, each element is considered individually when determining spatial relationships between each of the other elements. In the implementation of FIG. 7, multiple elements (e.g. two or more elements) are "grouped" for consideration as a single element of the content being displayed on the user interface UI. As illustrated in the example implementation, element E1 (shown as a circle) and element E2 (shown as an octagon) are grouped together as element G1, defined by the dotted lines forming a square boundary. Grouped element G1 is then viewed as a single element for purposes of defining spatial relationships between elements appearing in the layout, as described with reference to FIG. 6. It is appreciated that although only two elements (elements E1 and E2) are illustrated in the grouped element (element G1) of the disclosed implementation, any number of elements may be grouped together to form a single, grouped element. Moreover, the grouping of elements is not limited to the specific implementation disclosed whereby the group is defined by dotted lines forming a boundary.

Figure 8:
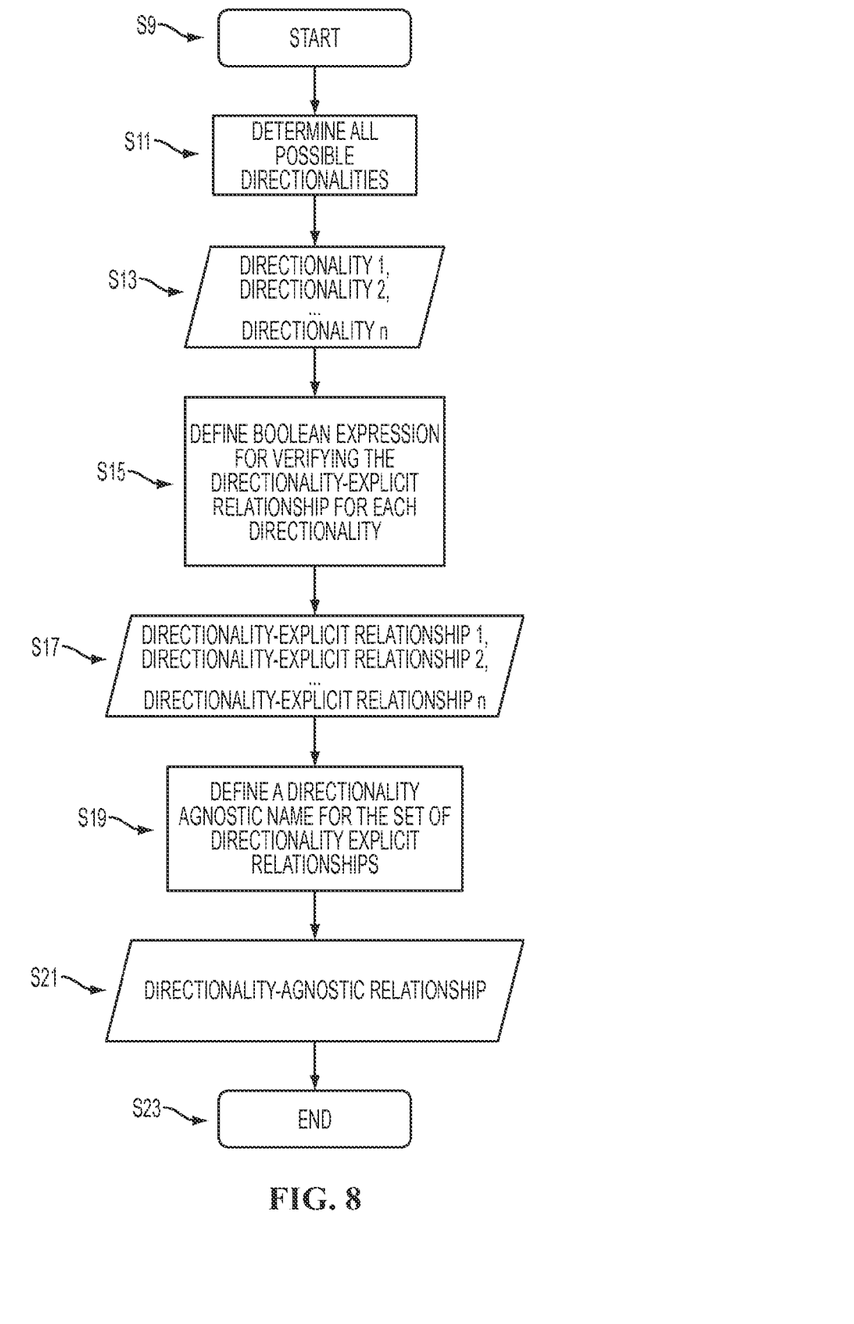
FIG. 8 is an example flow diagram of mapping spatial relationships.

FIG. 8 is an example flow diagram of mapping spatial relationships. To start verification (S9) of the display of content on a user interface, the computing device 102a first determines one or more directionalities associated with the elements comprising the content for display on a user interface at S11. For example, the computing device 102a determines that several directionalities exist, including directionality 1, directionality 2 . . . directionality n at S13. Directionalities may also be determined manually. From the determined directionalities, an expression (for example, a Boolean expression) representative of a directionality-explicit spatial relationship between the elements of the content for each of the determined directionalities is defined at S15. For example, an expression is defined for each directionality as follows at S17. For directionality 1, the expression is defined as directionality-explicit spatial relationship 1; for directionality 2, the expression is defined as directionality-explicit spatial relationship 2; and for directionality n, the expression is defined as directionality-explicit spatial relationship n (S17). Once each expression has been defined, the expressions are formed or grouped into a set representing a defined directionality-agnostic name at S19. For example, at S21 the set of expressions are named "Directionality-agnostic spatial relationship." Operation defining the relationships ends at S23. A more detailed example will be provided with reference to FIGS. 10 and 11. It is appreciated that although the described implementation refers to the computing device 102a as operationally performing the method, the disclosure is not limited to such an implementation. Any device capable of processing the method that is accessible by the system may be used to perform operations.

Figure 9:
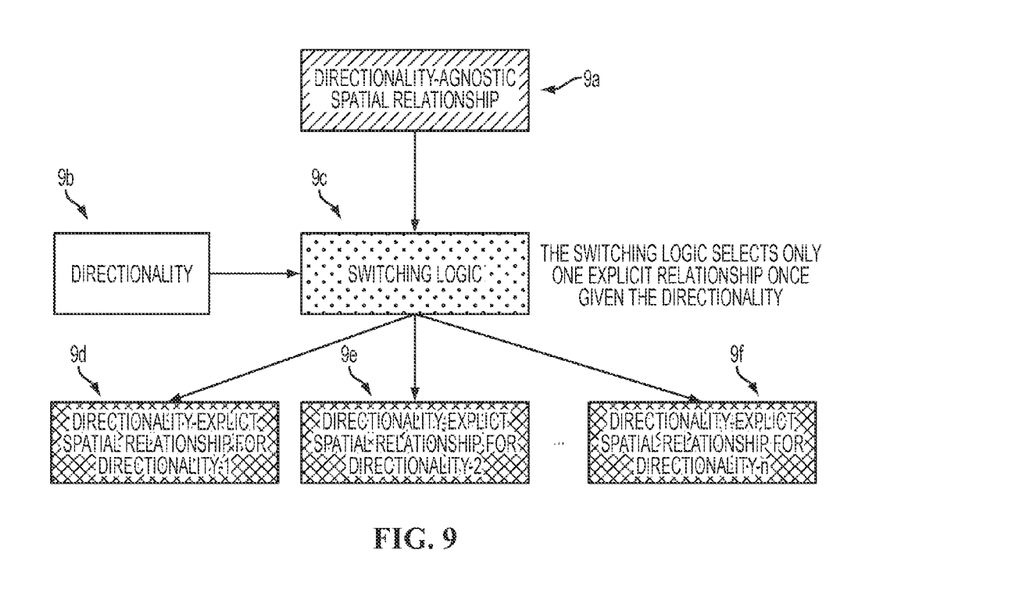
FIG. 9 is an example block diagram of mapping spatial relationships in accordance with FIG. 8.

FIG. 9 is an example block diagram of mapping spatial relationships in accordance with FIG. 8. Directionality-agnostic spatial relationship 9a is input into switching logic 9c based along with the directionality 9b on a user interface. The computer device 102a processes the defined expressions using switching logic 9c. Switching logic 9c may be part of processor 102b or separate logic (or computer device 102a or located elsewhere) defined as hardware, software or any combination thereof. Switching logic 9c receives the set of expressions defined as a directionality-agnostic spatial relationship 9a and the directionality 9b. With the directionality input at 9b, the switching logic 9c can define and apply one of the expressions (representative of the directionality-explicit relationship between elements) in the set from the directionality-agnostic spatial relationship. For example, depending on the directionality 9b that has been defined, switching logic 9c selects one of "directionality-explicit spatial relationship for directionality-1" 9d, "directionality-explicit spatial relationship for directionality-2" 9e or "directionality-explicit spatial relationship for directionality-n" 9f from the set as the directionality-explicit spatial relationship corresponding to the expression associated with the selected directionality 9b. If, for example, the directionality 9b had been defined as directionality-1, the switching logic 9b selects "directionality-explicit spatial relationship for directionality-1" 9d from the set as the directionality-explicit spatial relationship corresponding to the expression associated with the directionality-1. It is appreciated that although the described implementation refers to the computing device 102a as operationally performing the method, the disclosure is not limited to such an implementation. Any device capable of processing the method that is accessible by the system may be used to perform operations.

Figure 10:
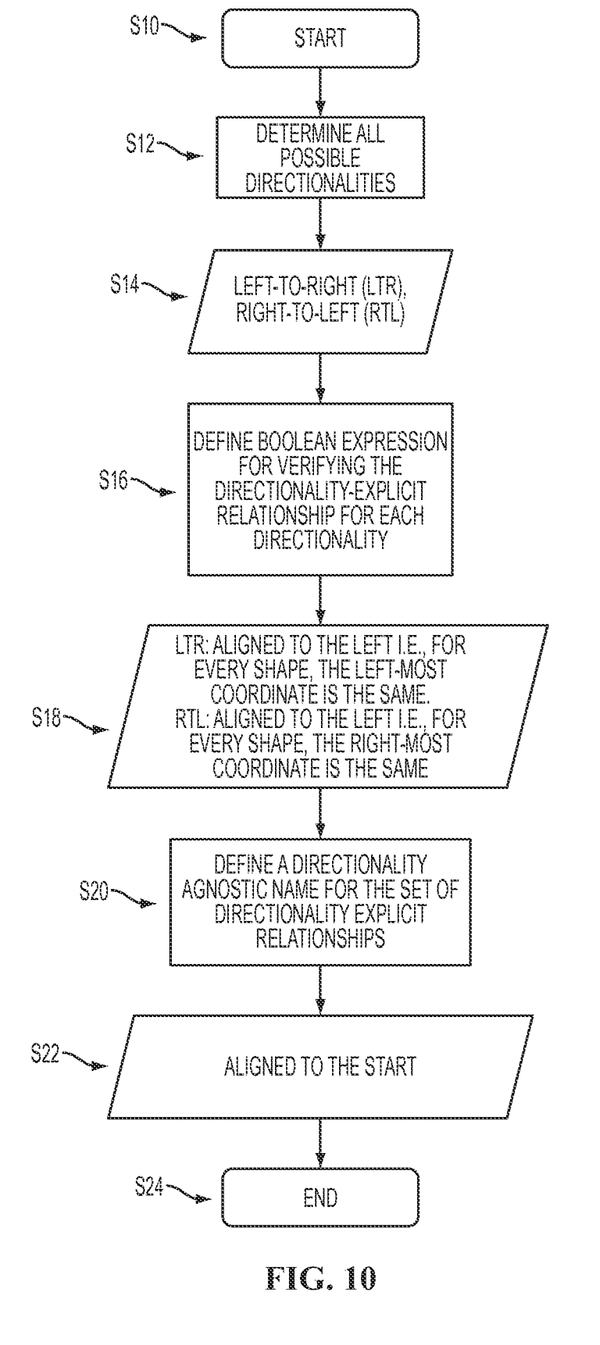
FIG. 10 is an example flow diagram of mapping spatial relationships in a horizontal alignment.

FIG. 10 is an example flow diagram of mapping spatial relationships in a horizontal alignment. To start verification (S10) of the display of content on a user interface, the computing device 102a first determines one or more directionalities associated with the elements comprising the content for display on a user interface at S12. For example, the computing device 102a determines that directionalities include LTR and RTL at S14. Directionalities may also be determined manually. From the determined directionalities, an expression representative of a directionality-explicit spatial relationship between the elements of the content for each of the determined directionalities is defined at S16. For example, an expression is defined for each directionality as follows at S18. For LTR, the expression is defined as "Aligned to the left" (which may be defined, for example, as having the left-most coordinate the same for each element). For RTL, the expression is defined as "Aligned to the Right" (which may be defined, for example, as having the right-most coordinate the same for each element). Once each expression has been defined, the expressions are formed or grouped into a set representing a defined directionality-agnostic name at S20. For example, at S22 the set of expressions are named "Aligned to the start." Operation defining the relationships ends at S24. It is appreciated that although the described implementation refers to the computing device 102a as operationally performing the method, the disclosure is not limited to such an implementation. Any device capable of processing the method that is accessible by the system may be used to perform operations.

Figure 11:
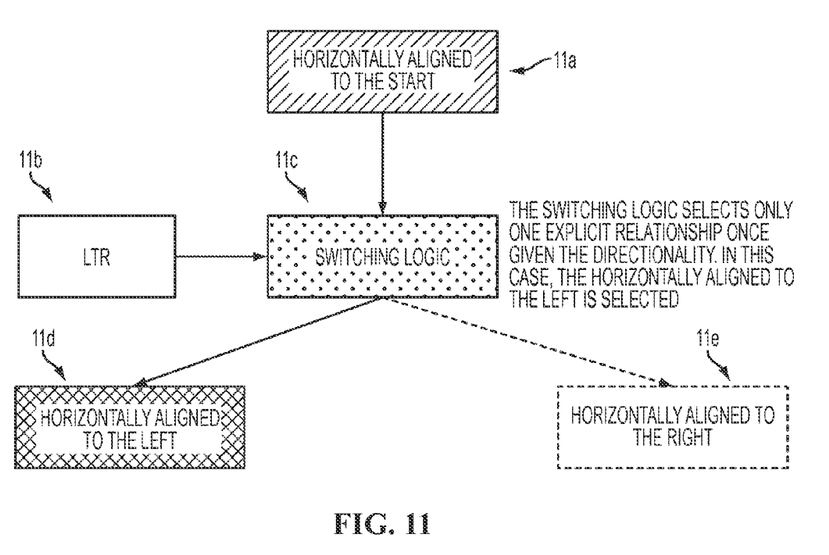
FIG. 11 is an example block diagram of mapping spatial relationships in a horizontal alignment in accordance with FIG. 10.

FIG. 11 is an example block diagram of mapping spatial relationships in a horizontal alignment in accordance with FIG. 10. The computer device 102a processes the defined expressions using switching logic 11c. Switching logic 11c may be part of processor 102b or separate logic defined as hardware, software or any combination thereof. Switching logic 11c receives the set of expressions defined as a directionality-agnostic name 11a (in this example, defined as "Horizontally aligned to the start") and the directionality 11b (in this example, "LTR") previously determined. With the directionality defined at 11b, the switching logic 11c can select and apply one of the expressions (representative of the directionality-explicit spatial relationship between elements) in the set. In this example, switching logic 11c selects "horizontally aligned to the left" 11d from the set as the directionality-explicit spatial relationship corresponding to the expression associated with the directionality LTR. If for example, the directionality 11b had been defined as RTL, the switching logic 11b would select "horizontally aligned to the right" 11e from the set as the directionality-explicit spatial relationship corresponding to the expression associated with the directionality RTL. It is appreciated that although the described implementation refers to the computing device 102a as operationally performing the method, the disclosure is not limited to such an implementation. Any device capable of processing the method that is accessible by the system may be used to perform operations.

Figure 12A:
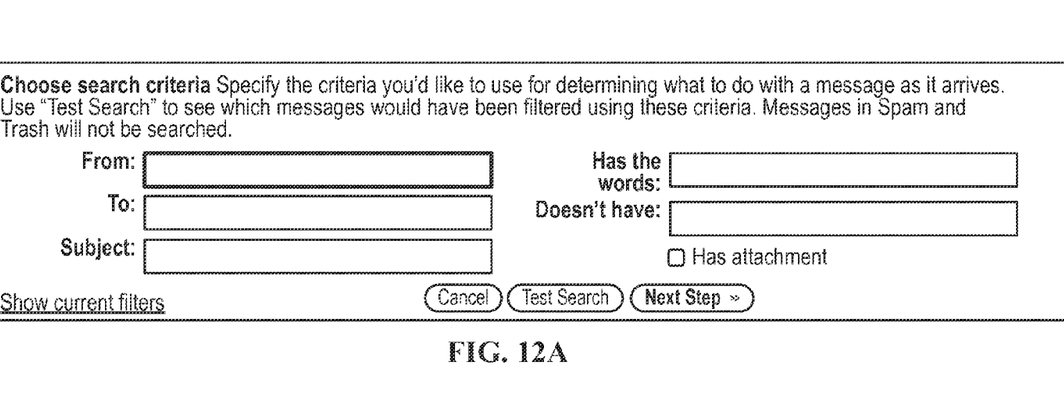
FIGS. 12A and 12B are example implementations of a window that includes multiple elements for display on a user interface.
Figure 12B:
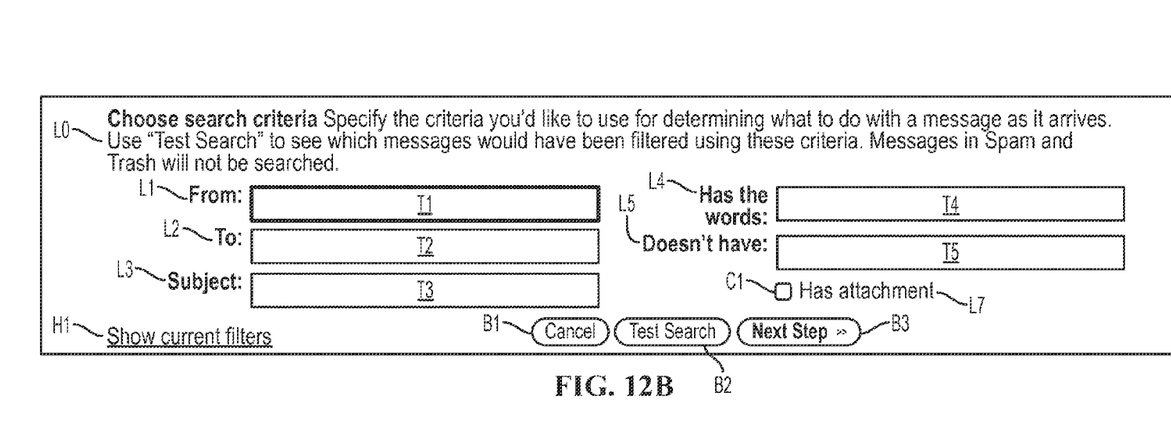

FIGS. 12A and 12B are example implementations of a window that includes multiple elements for display on a user interface. More specifically, FIGS. 12A and 12B illustrate an example display layout of a search criteria window that enables search filtering in a browser. FIG. 12A illustrates a version being displayed on the user interface, whereas FIG. 12B illustrates an annotated version of the user interface to verify the layout of the content on the screen. Each element L0-L5 and L7, T1-T5, H1, C1 and B1-B3 identifies a respective element on the display. For example, L1 represents the element "From:" and T1 represents the "From:" field (e.g. where data may be input) element. In order to verify the accuracy and consistency of the content layout, the operations described in accordance with FIGS. 8-11 are applied. For example, to confirm the layout accuracy of elements L1 and T1, basic layout properties are tested. One such basic layout property (expression) is: assertThat (T1, trails (L1)) (i.e. every "From:" is followed by a "From:" field). A simple reading of the expression confirms that element T1 trails (i.e. is after) element L1 when displayed on the user interface showing content read in a LTR language. As described above with respect to FIG. 7, horizontal positioning is dependent on directionality. Hence the use of the terms "leads" and "trails" allows for the forming of spatial relationships between elements that are directionality-agnostic. For example, in a LTR language, L1 is to the left of T1, and in a RTL language, L1 is to the right to T1 (not shown). This may be represented by a single expression, for example, "assertThat(L1, leads (T1))".

Figure 13:
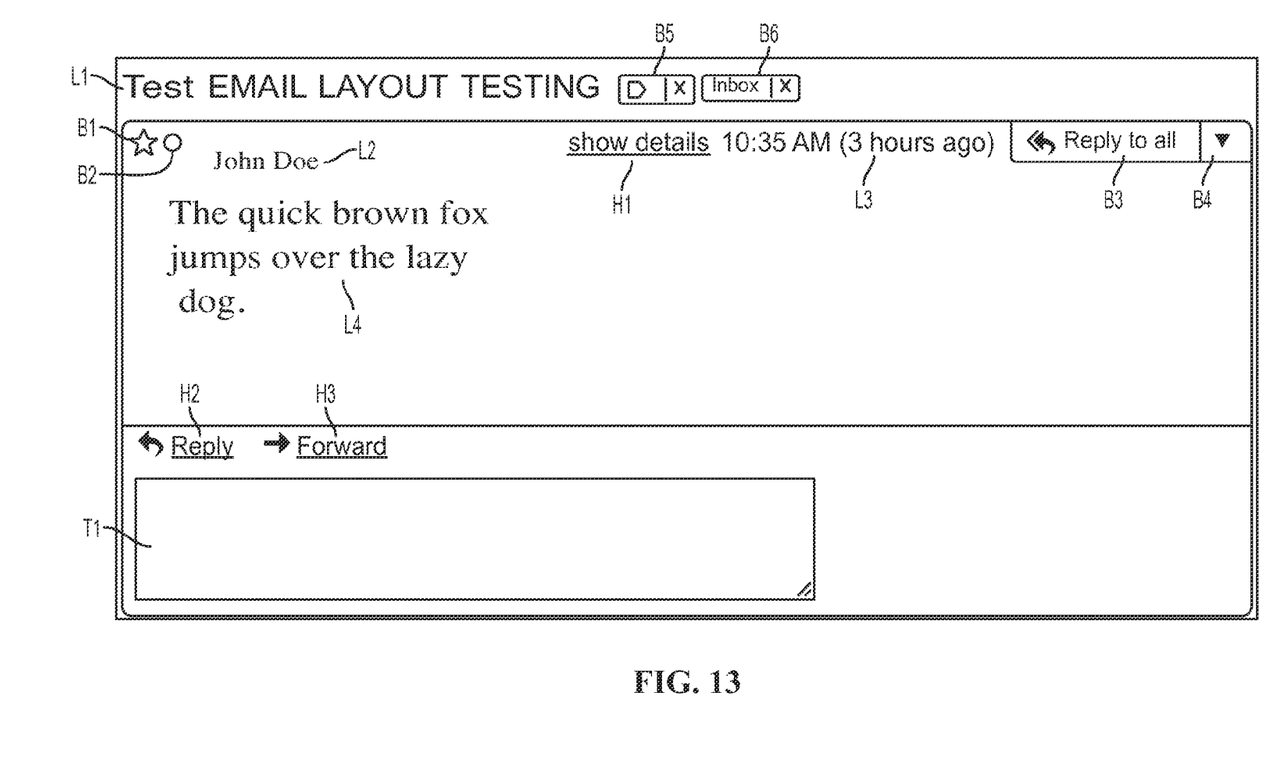
FIG. 13 is an example implementation of content displayed on a user interface including labels.
Figure 14:
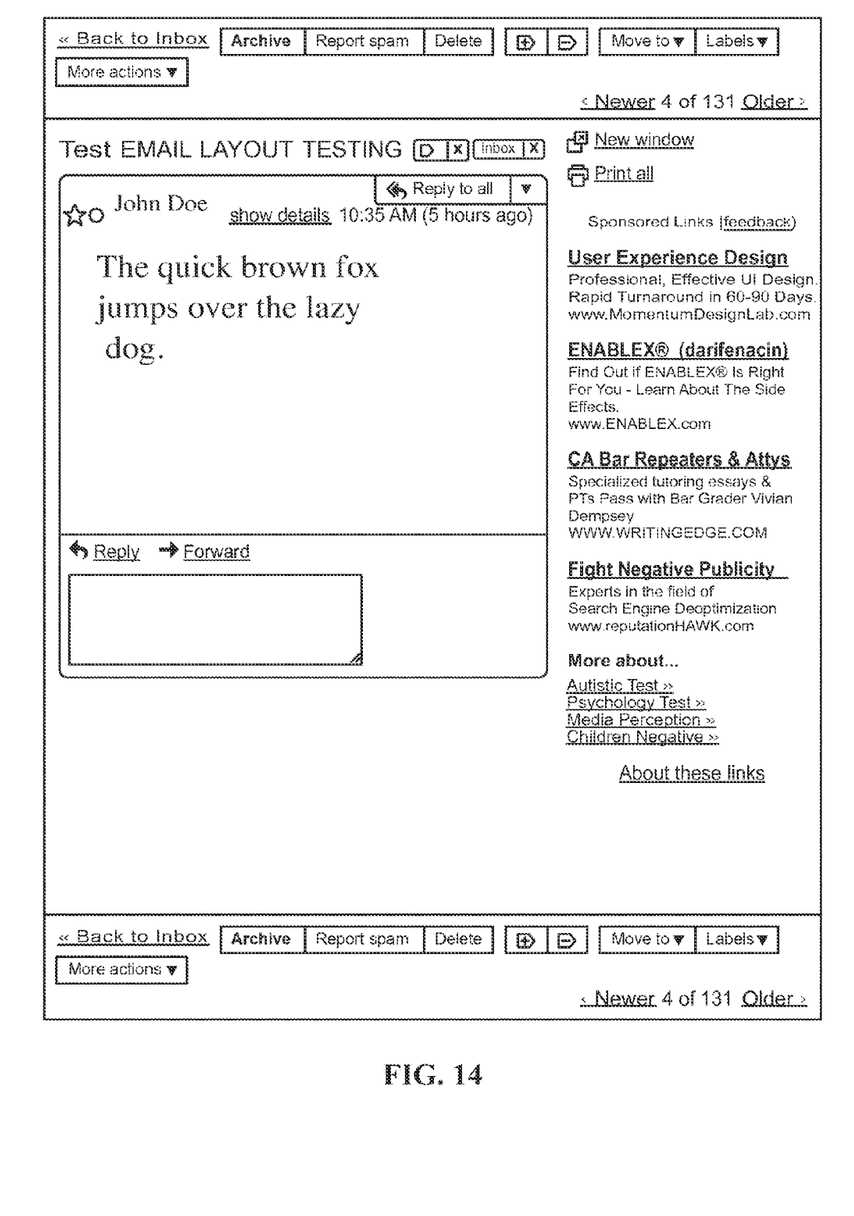
FIG. 14 is an example implementation of the content displayed in FIG. 13 presented in a different user interface.

FIG. 13 is an example implementation of content displayed on a user interface including labels. FIG. 14 is an example implementation of the content displayed in FIG. 13 presented in a different user interface.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the implementations disclosed herein.

The computer-readable medium may comprise a non-transitory computer-readable medium or media and/or comprise a transitory computer-readable medium or media. In a particular non-limiting, example implementation, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific implementations which may be implemented as code segments in computer-readable media, it is to be understood that dedicated hardware implementations, such as application specific integrated circuits, programmable logic arrays and other hardware devices, can be constructed to implement one or more of the implementations described herein. Applications that may include the various implementations set forth herein may broadly include a variety of electronic and computer systems. Accordingly, the present application may encompass software, firmware, and hardware implementations, or combinations thereof.

Although the present specification describes components and functions that may be implemented in particular implementations with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the implementations described herein are intended to provide a general understanding of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other implementations which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method, comprising:
   determining types of directionalities that each describe a visual direction of elements in a user interface layout;
   defining, for a rendering, expressions that each describe a first relationship for each determined type of directionality between the elements;
   forming a set comprising each of the expressions representative of each of the first relationships, the set defined as a second relationship based on spatial relationships that describe positions of the elements;
   receiving a selection of one of the determined types of directionalities;
   selecting one of the first relationships in the set that corresponds to the selection of one of the types of determined directionalities; and
   testing the user interface layout based on the spatial relationships of the elements and independent of the types of determined directionalities.

2. The computer-implemented method of claim 1, wherein the types of directionalities include one or more of horizontal alignment and a vertical alignment of the elements.

3. The computer-implemented method of claim 1, wherein the first relationship is a directionality-explicit spatial relationship and the second relationship is a directionality-agnostic spatial relationship.

4. The computer-implement method of claim 1, wherein testing the user interface layout based on the spatial relationships of the elements includes verifying an accuracy and a consistency of the user interface layout for at least one of different browsers, different supporting platforms, different layout properties, different screen dimensions, different window dimensions, and different languages.

5. The computer-implemented method of claim 1, wherein selecting one of the first relationships in the set that corresponds to the selection of one of the types of determined directionalities includes mapping the second relationship to the first relationship based on the types of determined directionalities.

6. The computer-implemented method of claim 1, wherein the types of directionalities include left-to-right content and right-to-left content that are displayed within the elements and wherein the left-to-right content is displayed in an opposite direction from the right-to-left content.

7. The computer-implemented method of claim 1, wherein forming the set includes grouping the elements to form a single element.

8. A computer-implemented method, comprising:
   determining types of directionalities that each describe a visual direction of elements in a user interface layout;
   determining, for a first rendering of a user interface, one or more first relationships between a first element from a group of elements and a second element from the group of elements based on a direction from the first element to the second element;
   abstracting from the one or more first relationships to define a second relationship based on a relative spatial relationship that describes positions of the first element and the second element, where the relative spatial relationship is different from the direction from the first element to the second element;
   determining one of the types of directionalities for a second rendering of the user interface layout;
   mapping the second relationship to the first relationship based on the determined type of directionality of the second rendering; and
   testing the user interface layout based on the mapping of the second relationship to the first relationship independent of the types of determined directionalities.

9. A computer-implemented system, comprising:
   a memory; and
   at least one processor accessing the memory and operative to perform operations comprising:
   determining types of directionalities that each describe a visual direction of elements in a user interface layout;
   defining, for a rendering, expressions that each describe a first relationship for each determined type of directionality between the elements;
   forming a set comprising each of the expressions representative of each of the first relationships, the set defined as a second relationship based on spatial relationships that describe positions of the elements;

receiving a selection of one of the types of determined directionalities;

selecting one of the first relationships in the set that corresponds to the selection of one of the types of determined directionalities; and testing the user interface layout based on the spatial relationships of the elements and independent of the types of determined directionalities.

10. The computer-implemented system of claim 9, wherein defining expressions that describe the first relationships for types of determined directionalities between the elements comprises defining one or more Boolean expressions.

11. The computer-implemented system of claim 9, wherein the first relationship is a directionality-explicit spatial relationship and the second relationship is a directionality-agnostic spatial relationship.

12. The computer-implement system of claim 9, wherein testing the user interface layout based on the spatial relationships of the elements includes verifying an accuracy and a consistency of the user interface layout.

13. The computer-implemented system of claim 9, wherein selecting one of the first relationships in the set that corresponds to the selection of one of the types of determined directionalities includes mapping the second relationship to the first relationship based on the types of determined directionalities.

14. The computer-implemented system of claim 9, wherein the types of directionalities include left-to-right content and right-to-left content that are displayed within the elements and wherein the left-to-right content is displayed in an opposite direction from the right-to-left content.

15. The computer-implemented system of claim 9, wherein forming the set includes grouping the elements to form a single element.

16. A computer program product embodied on a non-transitory computer-readable medium and storing a computer program to direct at least one computer processor to perform operations comprising:

determining types of directionalities that each describe a visual direction of elements in a user interface layout;

defining, for a rendering, expressions that each describe a first relationship for each determined type of directionality between the elements;

forming a set comprising each of the expressions representative of each of the first relationships, the set defined as a second relationship based on spatial relationships that describe positions of the elements;

receiving a selection of one of the determined directionalities;

selecting one of the first relationships in the set that corresponds to the selection of one of the types of determined directionalities; and testing the user interface layout based on the spatial relationships of the elements and independent of the types of determined directionalities.

17. The computer program product of claim 16, wherein defining expressions that describe the first relationships for types of determined directionalities between the elements comprises defining one or more Boolean expressions.

18. The computer program product of claim 16, wherein the first relationship is a directionality-explicit spatial relationship and the second relationship is a directionality-agnostic spatial relationship.

19. The computer program product of claim 16, wherein testing the user interface layout based on the spatial relationships of the elements includes verifying an accuracy and a consistency of the user interface layout.

20. The computer program product of claim 16, wherein selecting one of the first relationships in the set that corresponds to the selection of one of the determined directionalities includes mapping the second relationship to the first relationship based on the types of determined directionalities.

21. The computer program product of claim 16, wherein the types of directionalities include left-to-right content and right-to-left content that are displayed within the elements and wherein the left-to-right content is displayed in an opposite direction from the right-to-left content.

22. The computer program product of claim 16, wherein forming the set includes grouping the elements to form a single element.

* * * * *